Oct. 11, 1960 R. J. STARK 2,955,642
METHOD FOR FORMING LAMINATED OBJECTS
Filed Aug. 9, 1954
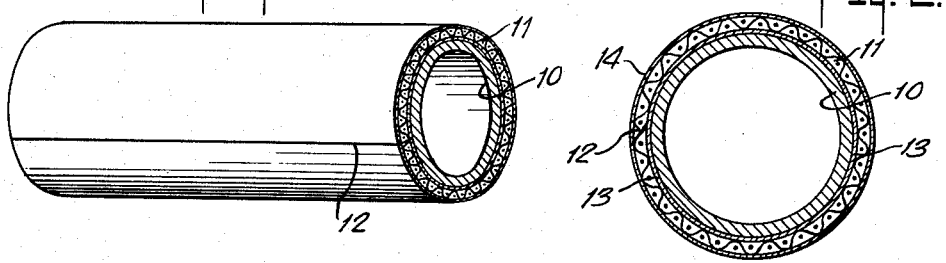
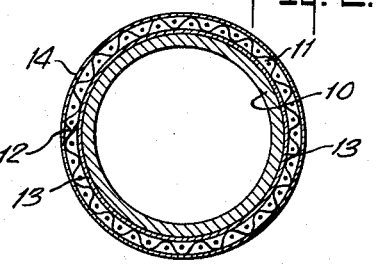
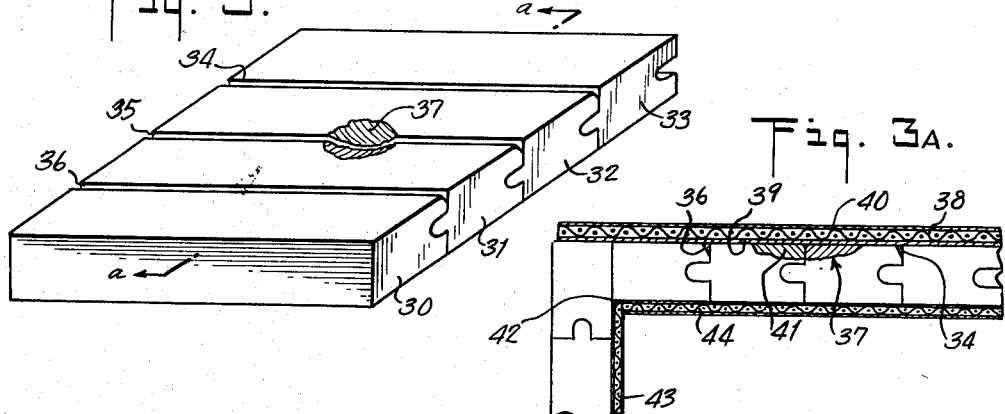
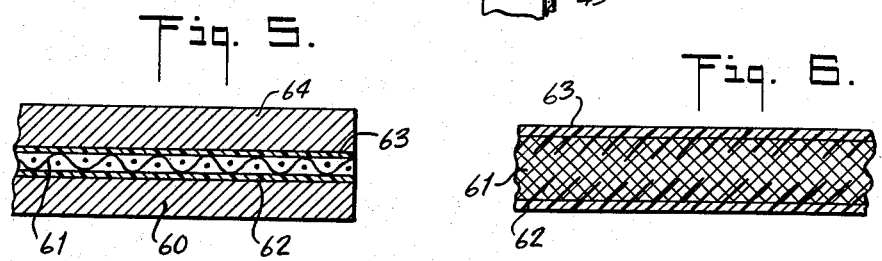
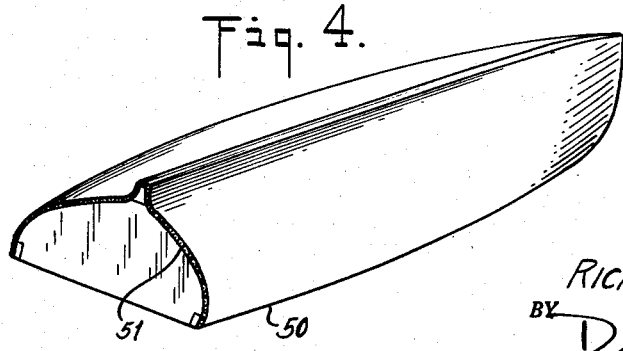
INVENTOR.
RICHARD J. STARK
BY
Darby + Darby
ATTORNEYS

United States Patent Office 2,955,642
Patented Oct. 11, 1960

2,955,642
METHOD FOR FORMING LAMINATED OBJECTS

Richard J. Stark, Whitestone, N.Y., assignor to Horsey, Robson & Co., Inc., a corporation of New York Filed Aug. 9, 1954, Ser. No. 448,656

5 Claims. (Cl. 154—41)

This invention relates to a method and a composition for forming laminated objects, and to a laminated object characterized by its durability, prepared in accordance with the method.

Many maintenance problems on an industrial scale involve the repair of a structure of sheet metal, wood, plastic or the like, wherein the article overall may be basically sound but it has worn areas or, as a result of some accident, is punctured. For example, air conditioning installations have many ducts and although they generally withstand corrosion adequately, the possibility of the loss of a duct through a puncture always exists, and frequently causes serious complications when repair becomes necessary. Similarly in air conditioning installations the outdoor water cooling towers often develop holes caused by corrosion, which may not permit salvaging of the structure by means of welded patch work. Generally where sheet iron or sheet metal structures are in use the welding of patches is a problem, because through steady loss of material through corrosion there may be insufficient body left for a proper welding job.

Similar problems occur in the repair of automobiles. There corrosion of parts of the body frequently cannot be repaired by the insertion of a welded element.

Where wooden structures are involved, such as the sidewalls of outdoor buildings, doors, or even boat hulls, the problem of providing a weatherproof surface is also an extant one. Other structures, such as masonry, plastic, or fabric, are similarly subject to damage and need of repair. The basic problem is to provide a new wearing surface which preferably is not a mere refinished portion of the old, but will furnish durability comparable with a reconstructed object.

It is, accordingly, a fundamental object of this invention to provide a method of repairing structures which is characterized by its simplicity and the fact that the structure is given a new wearing surface without altering the basic structure itself.

It is another object of the invention to provide a method and composition for repairing wooden structures.

It is a further object of the invention to provide a method and composition for repairing metal structures.

Other objects and advantages of the invention will in part be obvious and in part appear hereinafter.

The invention, accordingly, is embodied in a method of repairing articles and applying new surfaces thereto which is characterized by the employment of a fabric such as canvas, glass fibre cloth, wool, or other natural or synthetic fibre fabric, felted fibres, and even paper and pasteboard, impregnated throughout with a plastic-colloidal clay composition such as cellulose nitrate and a bentonite type clay, which is adapted to be essentially fused onto a surface, the method including the step of saturating such plastic impregnated fabric with a solution of a compatible resin, such as a modified alkyd, and applying the thus treated fabric to the surface to be repaired. By fitting the fabric onto the surface a complete new exterior surface is obtained and the structure is characterized by the lamination of the plastic impregnated fabric on the basic material thereby to give a structure generally of greater strength and durability than the basic one itself.

Reference to the accompanying drawings will illustrate the invention in greater detail.

Figure 1 illustrates a conduit having applied to its surface a sheet of material in accordance with the method of this invention;

Figure 2 is a section across the conduit showing the sheet in place and illustrating the lamination;

Figures 3 and 3A illustrate application of the sheet to form a patch;

Figure 4 illustrates application of the sheet to a boat hull;

Figure 5 illustrates a section of a laminated wood object; and

Figure 6 illustrates the nature of the laminating fabric.

The sheet material preferred for use in accordance with this invention is a fabric of the general nature of canvas which has been impregnated with a plastic emulsion containing colloidal clay so that medium weight canvas is formed to a sheet approximately 1/8" in thickness and may be designated generally the colloid treated fabric, in accordance with one of the forms in which it is sold. A commercial form of the material is sold under the trademark "Celastic."

An essential characteristic of the colloid treated fabric to be used in accordance with the invention is that it be a flexible material which will generally be a loosely woven cotton, so that it can be soaked and thoroughly impregnated with the colloidal plastic. Generally sufficient cellulose nitrate and clay are used to give it the texture and thickness of a heavy blotting paper. The material as thus prepared can be rendered adhesive by softening it with a solvent and applying the wetted fabric to the surface to be repaired. Very quickly the solvent evaporates and, a short period after application to a surface, it hardens and, generally, within about a half hour the surface can be handled under ordinary conditions. In about a day it can be treated with ordinary tools, sandpapered and worked.

In accordance with the improved technique constituting an essential feature of this invention, the colloid treated fabric in being applied is first activated in a solution composed of a solvent carrying a film-forming resin, such as alkyd resin, modified with nitrocellulose, in an amount up to 50 percent. The solvent used may be of the family of ketones, such as methyl ethyl ketone, esters, alcohols or ethers, the only essential requirement being that it be compatible with the resins in the composition. Generally, compounds useful as lacquer solvents may also be used, i.e. butyl acetate, amyl acetate, cellosolve types, or mixtures thereof, etc.

A preferred activating composition for use in the laminating operation is an alkyd resin dissolved in a solvent consisting of methyl ethyl ketone and butyl acetate, the total amount of solid in the solution being about 15 percent. A controlling property in making up a solution of the resin is its viscosity, for a solution containing more than about 25 to 35 percent of resin may be too viscous to be of maximum usefulness. However, higher solid solutions and higher viscosity solutions may be brushed, rolled or sprayed on.

The film-forming resin may be any pure or modified alkyd, polyester, phenol formaldehyde, urea or melamine formaldehyde, epoxy, vinyl, acrylate, styrene, synthetic rubber, or any other synthetic or natural resin that will impart improved mechanical, chemical and moisture resistance, flexibility and/or adhesiveness to the colloid treated fabric.

Some detailed typical formulations are as follows:

*Example I*

|  | Parts wgt. |
|---|---|
| 30 percent phthalic anhydride-soybean oil-modified alkyd resin | 75 |
| Xylol | 225 |
| 95 percent isopropanol | 210 |
| Ethylene glycol monoethyl ether | 200 |
| N-Butyl acetate | 223 |
| Anti-mildew agent [1] | 7 |

[1] Anti-mildew agent: inorganic, zinc oxide; organic, mercurials such as phenyl mercuric salicylate.

*Example II*

|  | Parts wgt. |
|---|---|
| 35 percent phthalic anhydride-castor oil-modified alkyd resin | 60 |
| Melamine formaldehyde resin | 15 |
| Butanol | 15 |
| N-Butyl acetate | 600 |
| Xylol | 300 |
| Anti-mildew agent [1] | 7 |

[1] Anti-mildew agent: inorganic, zinc oxide; organic, mercurials such as phenyl mercuric salicylate.

The resins used in making up the impregnating solution are employed in their commercial form, i.e., as solutions or plastisols of specific resin content. The typical alkyd preferred, that of Example I, has a molecular weight of 800–1500 and is obtained as a 50 percent solution in xylol. As such it has a specific gravity of 1.16 and weighs 8.23 pounds per gallon. Its viscosity is 5.5–10.7 poises on the absolute scale, T–W on the Gardner scale. Resin solutions having a comparable amount of film-forming ingredient capable of giving a like degree of hardness are useful in the application of this invention.

For applying the impregnated fabric to a surface in accordance with this invention the undersurface, whether it be wood or metal, should be thoroughly cleaned and dried. Generally it is found convenient to cut pieces of the fabric to a size matched to the area to be covered and which can be easily handled. The sheets are then immersed in the solution of resin in the solvent until they are thoroughly saturated (generally about 5 to 10 or 20 seconds). The fabric thus soaked, which in its dry form is a relatively stiff sheet, becomes quite limp, is then laid in place and fitted over the area with precautions taken to avoid the trapping of air bubbles under the sheet. The material during the period of drying is pressed firmly in place with a roller or manually to insure contact; all edges also being firmly pressed down. As it dries it hardens and shrinks slightly.

If spots occur where air bubbles have been trapped it is best to permit the material to dry, puncture the air bubble with a needle, moisten the spot with solvent and work the air out through the puncture as the fabric is worked into contact with the surface. The operation of applying the wet sheet should be conducted rapidly so that it is essentially accomplished while the material is thoroughly wet.

Shortly after being laid the material becomes tacky and as it dries further it becomes somewhat stiffer and leathery and finally it hardens thoroughly. Under favorable atmospheric conditions it can be walked on as soon as 30 minutes after it has been laid in place.

For rapid operation it is acceptable to overlap the edges of adjacent sheets about one inch, but joints can be butted so closely that they become undetectable when the surface has been sanded and painted. To make good butt joints sheets should be overlapped about 1/16" and then the upper ply is merely pushed back gently until it just butts against the adjacent sheet. The seam is rubbed with a rounded tool until the plastic in the sheet welds the two edges together.

On a concave surface on cylinders, for example, such as round tanks or conduits, the fabric should be laid at right angles to the curvature. Individual sheets should be no wider than the radius of curvature of the object being covered, and in any case should not be less than about 8 inches in width. On inside corners one strip is laid on one plane to the juncture with the second plane and it is covered with the second one overlapping the first. They are pressed into the corner with the finger tip or a blunt instrument.

The fabric when soaked and applied in accordance with this invention reaches its maximum efficiency when all of the solvent has evaporated. Sometimes on a porous undersurface, such as wood, so much solvent is taken up that drying takes several days. Generally the completion of the drying can be detected by the disappearance of the odor of the solvent. When the applied material has reached its prime condition, the edges are sandpapered and the surface finished by painting with ordinary paint. Generally vinyl resin base paints or paints which use lacquer solvents are to be avoided, because these soften the surface by dissolving the resin which has been applied.

Where the surface to be treated is, for example, a worn deck or staircase and it is desired to have it develop non-skid properties, the surface, just prior to drying, while the material is still moderately tacky, is rubbed with grit such as dry sand, pumice, ground mica, garnet, aluminum oxide or silicon carbide. Upon drying of the material the grit then is bound firmly in place and a non-skid surface is obtained.

In applying the material to old wood, the surface should be cleaned down to the bare wood. A coarse grit sandpaper is useful for removing old paint, and also has the virtue that it leaves a scoured surface favorable for close adhesion of the laminant. Large cracks should be filled and rotted areas also should be built up so that a uniform curvature or surface is available for application of the material.

Reference to the following drawings will illustrate in some detail the method for application of the plastic as well as the formation of laminated articles in accordance with this invention.

In Figure 1 there is shown a perspective view of a typical conduit in which 10 represents the conduit wall which, in air conditioning installations, will generally be formed of a sheet iron, and 11 represents the applied fabric with the joint being identified as 12.

Figure 2 shows an enlarged section taken across the conduit in order to illustrate the details of the lamination which is produced in an article formed in accordance with this invention. There 10 and 11 are shown, and for best finished appearance a tapered joint 12 is made. The laminating plastic which is applied to the fabric by soaking it in the composition described is indicated by 13, which constitutes a thin layer between the fabric and conduit, and 14 thin outer layer which forms on the fabric when it is completely installed.

Figure 3 is a diagrammatic illustration of the technique of lamination applied to an object made of wood, for example, in which matched boards are employed. There 30, 31, 32 and 33 represent a series of matched boards, which in an object which has withstood some weathering, will have an exterior appearance characterized by the presence of somewhat enlarged seams between the boards identified as 34, 35 and 36. For purposes of illustrating the technique of repairing such a surface, a damaged area 37 has been indicated.

In Figure 3a which constitutes a section taken along the line a—a of Fig. 3, the details of the repaired lamination objection may be seen, and therein 38 represents the applied plastic impregnated fabric, 39 the laminating intermediate layer, and 40 the immediate exterior skin which develops on the fabric when treated in accordance with the invention. The damaged section identified as 37 is filled with plastic impregnated fabric 41 so that the exterior finished surface is substantially flat. Completion of the repair work is also shown in Figure 3a, where the cracks 34 and 36 are shown filled with crack filler.

The formation of an inside joint is shown in Figure 3a also by carrying the structure around a corner 42 and indicating the placement of laminating layers 43 and 44 at such corner.

Figure 4 is a simplified sketch of a boat hull 50 and for renovation of the entire exterior of a boat hull the application of the plastic impregnated fabric in accordance with the technique of this invention is a feasible operation. Following the technique described in conjunction with Figures 3 and 3a, joints in the hull are repaired and a sheet of the fabric 51, large enough to cover the entire hull, is applied as a single unit, closely rolled onto the hull and ultimately finished off.

In Figure 5 the technique of laminating wood sheets or boards to develop a thick structural unit is shown. Therein board 60 is laminated with a fabric layer 61 employing resin layers 62 and 63, which with the fabric serve to hold the second layer of wood 64 in close adhesion therewith.

In Figure 6 the effect obtained through treatment with plastic impregnated fabric in accordance with this invention is shown somewhat diagrammatically. By soaking the fabric in the solution of resin as described soaking of the fabric by the solvent is obtained and the degree of penetration with the plastic is such that the exterior becomes coated with the plastic whereas the interior thereof contains a graduated amount thereof reaching a minimum near the central area. With such material new exterior surfaces can be formed on objects, and internal cores, as shown in Figure 5, are also readily made.

Although the invention has been described in conjunction with only a few embodiments, it is to be understood that variations thereof may be practiced without departing from its spirit and scope.

What is claimed is:

1. The method of laminating and reinforcing a structural base which comprises impregnating and coating a normally stiff sheet of fabric with a penetrating solution until said sheet becomes limp, applying said limp sheet to said structural base, and drying said fabric to hardness in situ, said sheet of fabric being initially impregnated with a nitrocellulose-colloidal clay composition, and said penetrating solution comprising an alkyd resin compatible with said nitrocellulose-colloidal clay impregnated fabric.

2. The method defined in claim 1, wherein the sheet of fabric is a cellulose fiber sheet.

3. The method of laminating to a structural base a stiff sheet of fabric impregnated with nitrocellulose and colloidal clay which comprises applying to said stiff fabric a solution of alkyd resin in a solvent for nitrocellulose, maintaining said solution in contact with said fabric thereby impregnating said stiff fabric sheet with said solution and rendering said fabric sheet limp, applying said limp fabric sheet to said structural base, and drying said fabric to hardness in situ.

4. The method of laminating to a structural base a stiff sheet of fabric impregnated with nitrocellulose and colloidal clay which comprises applying to said stiff fabric a solution of alkyd resin in a solvent for nitrocellulose, maintaining said solution in contact with said fabric thereby impregnating said stiff fabric with said solution and rendering said fabric sheet limp, applying said limp sheet to said structural base, and drying said fabric to hardness in situ, said solvent for nitrocellulose comprising in solution between about 5% and about 35% by weight said alkyd resin.

5. The method of laminating and reinforcing a structural base, comprising providing a stiff fabric initially impregnated with nitrocellulose and colloidal clay, further impregnating said fabric with a solution of an alkyd resin compatible with said impregnated fabric thereby rendering said fabric limp, applying said fabric to the structural base, and drying said fabric to hardness in place.

References Cited in the file of this patent
UNITED STATES PATENTS

| Number | Name | Date |
|---|---|---|
| 1,309,581 | Matheson | July 8, 1919 |
| 1,689,567 | Turner | Oct. 30, 1928 |
| 1,905,827 | Ellis | Apr. 25, 1933 |
| 2,263,661 | Walker | Nov. 25, 1941 |
| 2,298,295 | Hyatt et al. | Oct. 13, 1942 |
| 2,304,585 | McMinn | Dec. 8, 1942 |
| 2,336,266 | Lester | Dec. 7, 1943 |
| 2,359,097 | Elsey | Sept. 26, 1944 |
| 2,404,904 | Collins | July 30, 1946 |
| 2,560,026 | Brown | July 10, 1951 |
| 2,572,879 | Morris et al. | Oct. 30, 1951 |
| 2,636,836 | Whigham et al. | Apr. 28, 1953 |
| 2,646,414 | Gillespie | July 21, 1953 |
| 2,653,889 | Hager et al. | Sept. 29, 1953 |
| 2,681,325 | Abernethy | June 15, 1954 |

OTHER REFERENCES

Article entitled, "Understanding Plastics Chemistry" by Dr. George H. Brother, printed in Plastics; July 1945, pages 82, 84 and 86 of interest.